United States Patent [19]

Titti et al.

[11] Patent Number: 4,689,352
[45] Date of Patent: Aug. 25, 1987

[54] PRODUCTION OF PLASTIC FOAM MATERIAL WITH GAS-RELEASE CONTROL AGENT

[75] Inventors: Otello U. Titti; Patrick P. Cesta, both of Mississauga; Thomas H. Mitsopoulos, Toronto; Alan G. Wheeler, Oakville, all of Canada

[73] Assignee: Valvoline Oil & Chemicals Ltd., Mississauga, Canada

[21] Appl. No.: 930,076

[22] Filed: Nov. 12, 1986

Related U.S. Application Data

[63] Continuation of Ser. No. 786,430, Oct. 11, 1985, abandoned.

[51] Int. Cl.$^4$ .................................................. C08J 9/08
[52] U.S. Cl. ...................................... 521/88; 521/92; 521/97; 521/138; 521/182
[58] Field of Search ............... 521/88, 92, 97, 138, 521/182

[56] References Cited

U.S. PATENT DOCUMENTS

| | | | |
|---|---|---|---|
| 3,260,688 | 7/1966 | Watanabe et al. | 521/138 |
| 4,277,570 | 7/1981 | Michel | 521/138 |
| 4,281,073 | 7/1981 | Michel | 521/138 |
| 4,314,036 | 2/1982 | Throne et al. | 521/138 |

FOREIGN PATENT DOCUMENTS

| | | | |
|---|---|---|---|
| 652770 | 5/1951 | United Kingdom | 521/138 |
| 2029834 | 3/1980 | United Kingdom | 521/138 |

*Primary Examiner*—Morton Foelak
*Attorney, Agent, or Firm*—Robert F. Delbridge; Arne I. Fors

[57] ABSTRACT

A process for the production of plastic foam material includes forming a liquid mixture by mixing an unsaturated resin, a catalyst operable to cause curing of the unsaturated resin, a promoter operable to activate the catalyst, a gas-releasing salt, and an acid operable to cause the release of gas from the salt so that the liquid mixture foams and cures by gelling and subsequent hardening. Included in the mixture is a volatile liquid gas-release control agent which volatilizes during curing to maintain gas release passages open in the foam and thereby permit release of gases from the foam during hardening after gellation at least until the foam is structurally stable.

5 Claims, No Drawings

PRODUCTION OF PLASTIC FOAM MATERIAL WITH GAS-RELEASE CONTROL AGENT

This application is a continuation of application Ser. No. 786,430, filed Oct. 11, 1985, now abandoned.

This invention relates to the production of plastic foam material.

Plastic foams have been known for many years, and are conventionally manufactured by forming a liquid mixture by mixing resin, a catalyst operable to cause curing of the unsaturated resin, a promoter operable to activate the catalyst, a gas-releasing salt and an acid operable to cause the release of gas from the salt. The liquid mixture foams and cures by gelling and subsequent hardening.

Post-gellation gassing has long been a problem in such processes. The gas continues to be released after the gellation stage, that is to say while the mixture is hardening, and such gas usually adversely affects the end product. For example, the gas may cause the internal structure and external surface of the end product to be non-uniform and non-reproducible. Also, when the foam is structural foam, the gas may cause separation from another structure with which the structural foam is intended to be bonded.

It is therefore an object of the present invention to provide an improved process for the production of plastic foam material in which the problem of post-gellation gassing is reduced.

The present invention is based on the discovery that the harmful effect of post-gellation gassing is reduced if there is added to the mixture a volatile liquid gas-release control agent which volatilizes during curing and appears to maintain gas-release passages open in the foam and thereby permit release of gas from the foam during hardening after gellation, i.e. during cross-linking, at least until the foam is structurally stable.

The reason for the success of the invention is not properly understood. However, since the curing reaction is exothermic, with the main exothermic action occurring during hardening after gellation, i.e. during cross-linking, it may be that such heat release after gellation causes the gas-release control agent to be volatilized to a sufficient extent to maintain gas-release passages in the foam open at least until the foam is structurally stable.

The gas-release control agent in accordance with the invention may be caused to keep the foam open to permit gas-release during hardening without causing disruption and consequent breaking of the structure into pieces.

It has also been discovered that the use of the gas-release control agent in accordance with the invention has other advantages. For example, the foam density can be more accurately controlled, and may also be varied by use of the gas-release control agent. When the gas-release control agent is not used, the internal structure and external surface of the end product may be non-uniform and non-reproducible. When the gas-release control agent is used, the internal structure and external surface are substantially uniform and reproducible.

The invention is especially useful where the foam is a filled foam (such as polyester structural foam) used to reinforce a shaped article, for example an acrylic bath tub, the liquid mixture being applied to the shaped article and allowed to cure so that the cured foam is bonded to the article.

The liquid gas-release control agent in accordance with the invention should be volatile during the curing reaction and non-reactive, i.e. non-linkable, with the remainder of the mixture. When mixing takes place at ambient temperature to produce an exothermic reaction, it has been found that the gas-release control agent should have a boiling point lower than about 150° C., preferably from about 40° to about 80° C.

The gas-release control agent may, for example be methanol (boiling point about 65° C.), isopropyl alcohol, methylene chloride, methyl acetate, acetone, toluene or freon. The amount added may be from about 0.25 to about 10% by weight of the mixture, advantageously from about 0.75 to about 3%.

The invention is advantageously carried out by mixing two liquid components. The first component may typically include one or more resins, one or more monomers, one or more promoters, one or more inhibitors, a thixotropic agent, the gas-release control agent in accordance with the invention, and one or more fillers if desired. The second component may typically comprise one or more resins, a surfactant, a thixotropic agent, water, acid and catalyst. If desired, fire retardant or chemical resistant resins may be used.

For the first component, the resin may for example comprise an orthphthalic, isophthalic, halogenated type, or vinyl ester resin. The monomer may comprise styrene or its derivatives, methacrylate, or vinyl toluene. The promoter may comprise an amine or a metal drier. The inhibitor may comprise a quinone or hydroquinone. The thixotropic agent may comprise fumed or precipitated silica or clay. The filler may comprise alumina trihydrate, clay or talc.

For the second component, the resin may for example be as in the first component. The surfactant may comprise an ionic or non-ionic silicone. The thixotropic agent may be as in the first component. The acid may comprise an inorganic or an organic acid, such as citric, tartaric, acetic, or phosphoric acid. The catalyst may comprise a peroxide, a benzoyl compound, or methyl ethyl ketone.

The two liquid components are typically mixed with a volume ratio of from about 0.5:1 to about 2:1 depending upon the presence or otherwise of fillers or on final desired properties. A preferred ratio is about 1.4:1. The components may be mixed by manual operation or by mixing equipment. The gel time may be from about 1 to about 10 minutes, typically about 3 minutes, and the total curing time may be from about 10 to about 60 minutes, typically about 20 minutes.

The gas-releasing salt may be a carbonate or bi-carbonate, for example, calcium, sodium, potassium carbonate or bi-carbonate. The aqueous acid may be citric acid or other suitable organic or inorganic acid. The acid may be present in an amount of from about 0.75 to about 5%, preferably from about 1 to about 2% by weight of the mixture.

Tests were carried out with the production of a filled polyester structural foam, with varying amounts of gas-release control agent (methanol) being added in accordance with the invention in different tests, and the densities of the foam products were measured. The results were as follows:

| methanol (wt. %) | 0 | 0.75 | 1.5 | 3.0 |

| | -continued | | | |
|---|---|---|---|---|
| density (lb./cu. ft.) | 58 | 45 | 49 | 77 |

For a given composition, the amount of gas-release control agent used may be varied to produce a minimum density.

A composition for the production of polyester structural foam with mixture at room temperature and incorporating a gas-release control agent in accordance with the invention will now be given, by way of example only, in Table I. The two liquid components A and B are mixed in the ratio of 1.4:1 by volume respectively. The amount of each item is given as a percentage by weight of the respective liquid component A or B.

TABLE I

| | A % | B % |
|---|---|---|
| AROPOL C100 (resin) | 18.5 | 73.0 |
| AROPOL C135 (resin) | 4.0 | 12.0 |
| STYRENE (monomer) | 17.0 | — |
| DIMETHYL ANILINE (promoter) | 0.3 | — |
| DI-METHYL P-TOLUIDINE (promoter) | 0.3 | — |
| CABOSIL (thixotropic agent) | — | 1.0 |
| METHANOL | 2.4 | — |
| CALCIUM CARBONATE (filler) | 7.5 | — |
| DC 193 (surfactant) | — | 1.0 |
| CITRIC ACID | — | 3.5 |
| WATER | — | 5.4 |
| ALUMINA TRIHYDRATE (filler) | 50.0 | — |
| Benzoyl Peroxide (catalyst) | — | 4.1 |

(AROPOL C100 and AROPOL C135 are trade marks of Ashland Chemicals for polyester resins)
(CABOSIL is a trade mark of Cabot Company for a thixotropic agent comprising fumed silica).
(DC 193 is a trade mark of Dow Company for a surfactant).

Polyester structural foam was first produced in accordance with the composition given in Table A but the gas-control release agent (methanol) in accordance with the invention was omitted. The end product had a non-uniform internal structure and external surface, and had a density of 58 lb/cu. ft.

The test was repeated using methanol as specified in Table A, and the end product had a substantially uniform internal structure and external surface, thereby demonstrating the advantages of using a gas release control agent in accordance with the invention. The density was 45 lb/cu. ft.

Other examples and embodiments of the invention will be readily apparent to a person skilled in the art, the scope of the invention being defined in the appended claims.

What we claim as new and desire to protect by Letters Patent of the United States is:

1. A process for the production of plastic foam material consisting essentially of forming a liquid mixture by mixing an unsaturated polyester resin, a catalyst operable to cause curing of the unsaturated polyester resin, a promoter operable to activate the catalyst, a gas-releasing salt, and an acid operable to cause the release of gas from the salt, said acid being selected from the group consisting of citric acid, tartaric acid and acetic acid, such that the liquid mixture foams and cures in an exothermic reaction by gelling and subsequent hardening with the main exothermic reaction occurring during hardening after gellation, and including in the mixture of volatile liquid gas-release control agent with a boiling point of from about 40° to about 80° C., said gas-released control agent being selected from the group consisting of methanol and isopropyl alcohol, and which volatilizes during during to maintain gas release passages open in the foam and thereby permit release of gases from the foam during hardening after gellation at least until the foam is structurally stable.

2. A process according to claim 1 wherein the gas-release control agent comprises from about 0.25 to about 10% by weight of the mixture.

3. A process according to claim 2 wherein the gas-release control agent comprises from about 0.75 to about 3% by weight of the mixture.

4. A process according to claim 2 wherein the gas-release control agent comprises methanol.

5. A process according to claim 1 wherein the gas-releasing salt comprises a carbonate or a bi-carbonate.

* * * * *